(12) United States Patent
Waldén et al.

(10) Patent No.: US 11,837,925 B2
(45) Date of Patent: Dec. 5, 2023

(54) ORTHO-RADIAL INDUCTION GENERATOR

(71) Applicant: Ori Solution Oy, Lahti (FI)

(72) Inventors: Reijo Waldén, Lahti (FI); Jarmo Järvinen, Lahti (FI); Joakim Berndtsson, Lahti (FI); Mika Meller, Lahti (FI)

(73) Assignee: ORI SOLUTION OY, Lahti (FI)

( * ) Notice: Subject to any disclaimer, the term of this patent is extended or adjusted under 35 U.S.C. 154(b) by 0 days.

(21) Appl. No.: 17/737,652

(22) Filed: May 5, 2022

(65) Prior Publication Data

US 2022/0360155 A1 Nov. 10, 2022

(30) Foreign Application Priority Data

May 6, 2021 (EP) .................... 21172483

(51) Int. Cl.
*H02K 17/42* (2006.01)
*H02K 7/18* (2006.01)

(52) U.S. Cl.
CPC .......... *H02K 17/42* (2013.01); *H02K 7/1823* (2013.01)

(58) Field of Classification Search
CPC .. H02K 17/42; H02K 7/1823; F05D 2220/76; F01D 15/10
See application file for complete search history.

(56) References Cited

U.S. PATENT DOCUMENTS 8,466,576 B2   6/2013   Onsrud

FOREIGN PATENT DOCUMENTS

WO       2019/113579        6/2019
WO    WO-2019113579 A1 *   6/2019    ............ H02K 19/00

OTHER PUBLICATIONS

Extended European Search Report for EP Application No. 21172483.6 dated Nov. 5, 2021, 8 pages.

* cited by examiner

*Primary Examiner* — Joseph Ortega
(74) *Attorney, Agent, or Firm* — Nixon & Vanderhye PC (57) ABSTRACT

A generator comprising a rotor, at least one magnetic bridging element arranged to rotate about a rotation axis of the rotor in response to the rotation of the rotor, at least one inductance unit at an area of an influence of the moving magnetic bridging element for inducing electromotive force in response to the movement of the magnetic bridging element relative to the inductance unit, and at least one flow channel unit for conveying a fluid flow to the rotor for operating the rotor.

20 Claims, 4 Drawing Sheets

ORTHO-RADIAL INDUCTION GENERATOR

This application claims priority to EP 21172483.6 filed May 6, 2021, the entire contents of which is hereby incorporated by reference.

FIELD OF THE INVENTION

The invention relates to a generator for generating electrical energy.

BACKGROUND OF THE INVENTION

A generator or an electric generator is an electric machine that converts mechanical kinetic energy or motion energy in ortho-radial manner to electric current.

A generator comprises a rotor, a number of magnetic elements or magnets and a number of inductance coils. The magnetic element and the inductance coils may be arranged in the generator in different ways but the basic principle of the operation of the generator is that at least one of the at least one magnetic element and the at least one inductance coil are rotated relative to each other whereby electromotive force, i.e., voltage, is induced in the at least one inductance coil in response to the rotation of the at least one inductance coil in the magnetic field provided by the at least one magnetic element when the rotor rotates. The voltage induced in the at least one inductance coil causes the electric current in response for connecting the at least one inductance coil to a closed electric circuit.

BRIEF DESCRIPTION OF THE INVENTION

An object of the present invention is to provide a novel ortho-radial induction generator.

The invention is characterized by the features of the independent claim.

The invention is based on the idea of using a fluid flow to directly operate a rotor of a generator, the rotor being arranged to rotate relative to the flow channel unit in a floating bearing manner.

An advantage of the invention is a high coefficient of the efficiency of the generator because of converting the kinetic energy of the fluid flow straight to a rotational movement of the rotor in the generator with minimal losses of energy due to very low coefficient of friction of the solution.

Some embodiments of the invention are disclosed in the dependent claims.

BRIEF DESCRIPTION OF THE DRAWINGS

In the following the invention will be described in greater detail by means of preferred embodiments with reference to the attached drawings, in which

FIG. 1b shows schematically a top view of the generator of FIG. 1a;

FIG. 1d shows schematically a cross-sectional top view of the generator of FIGS. 1a and 1b along the line B-B in FIG. 1a;

FIG. 2b shows schematically a cross-sectional side view of a rotor according to FIG. 2a;

FIG. 3b shows schematically a side view of the flow channel unit of FIG. 3a;

FIG. 3c shows schematically a cross-sectional side view of the flow channel unit of FIGS. 3a and 3b along the line C-C in FIG. 3a.

For the sake of clarity, the figures show some embodiments of the invention in a simplified manner. Like reference numerals identify like elements in the figures.

DETAILED DESCRIPTION OF THE INVENTION

Figure 1A:
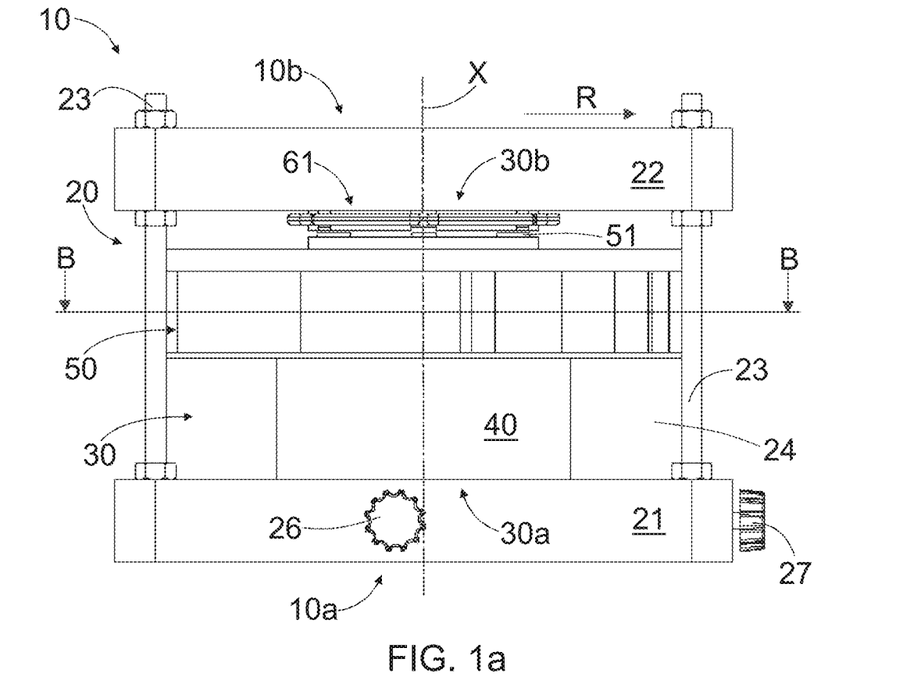
FIG. 1a shows schematically a side view of a generator.
Figure 1B:
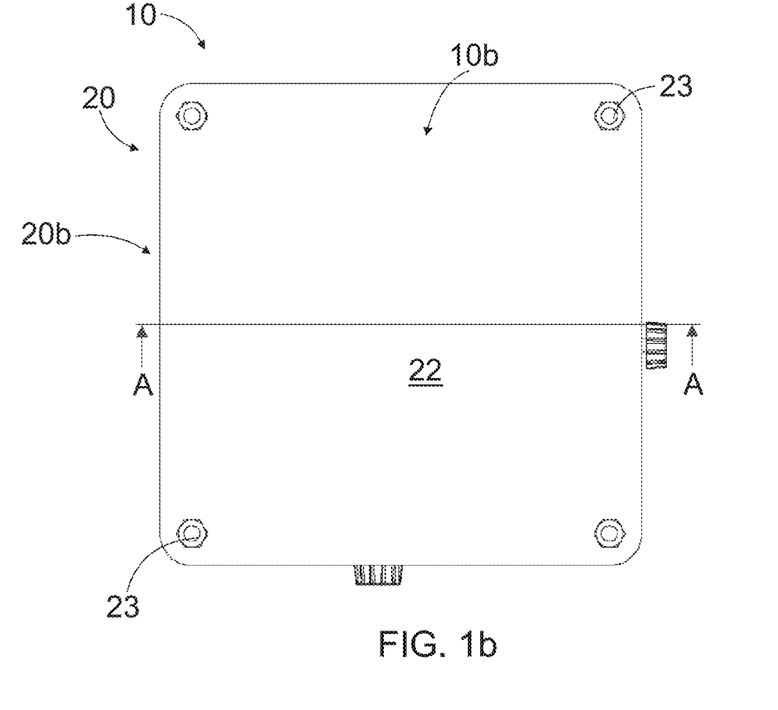
Figure 1C:
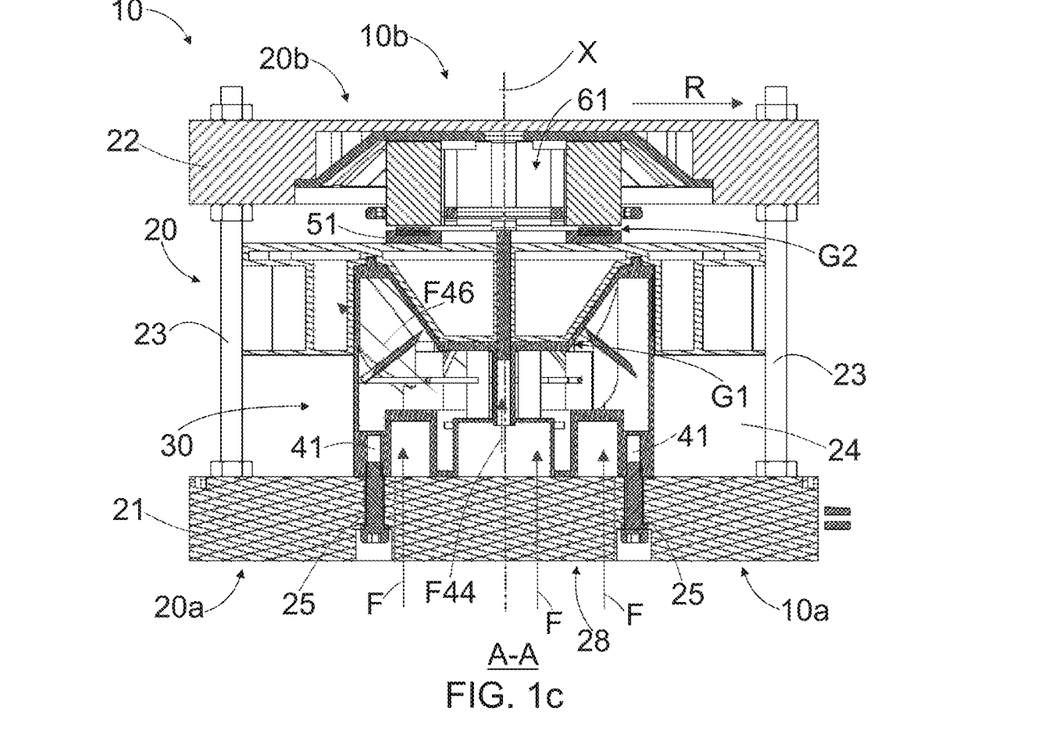
FIG. 1c shows schematically a cross sectional side view of the generator of FIGS. 1a and 1b along the line A-A in FIG. 1b.
Figure 1D:
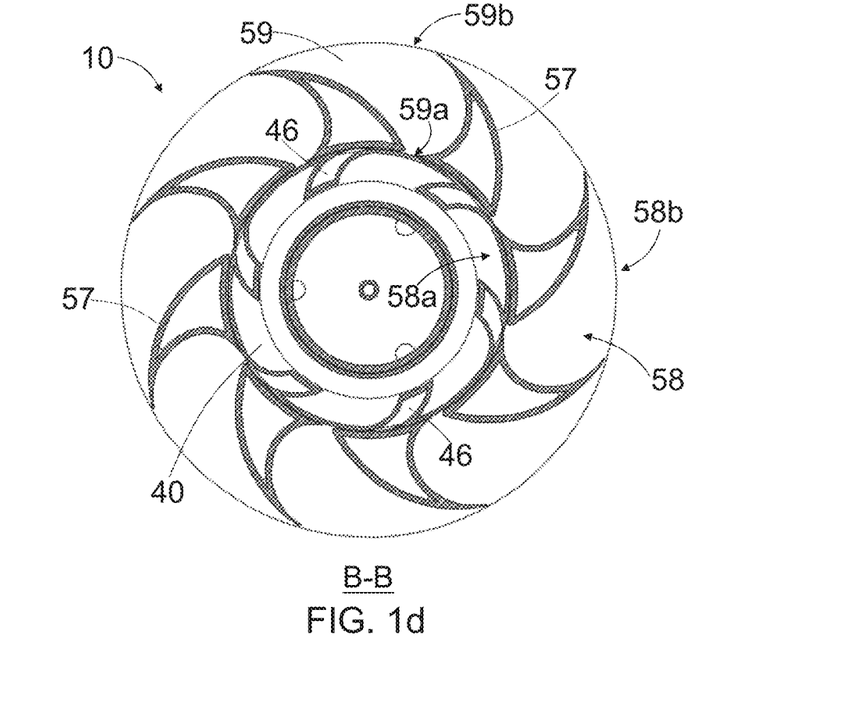

FIG. 1 is a schematic side view of a generator 10, FIG. 1b is a schematic top view of the generator 10 of FIG. 1a, FIG. 1c is a schematic cross sectional side view of the generator 10 of FIGS. 1a and 1b along the line A-A in FIG. 1b and FIG. 1d is a schematic cross-sectional top view of the generator 10 of FIGS. 1a and 1b along the line B-B in FIG. 1a. FIGS. 1a to 1d disclose only one possible embodiment of the generator 10, other embodiments of the generator 10, however, being possible according to the disclosed solution. It is notified herein that any possible term referring to a "top" of the generator 10 or any part thereof, a "bottom" of the generator 10 or any part thereof and a "side" of the generator 10 or any part thereof refers only to the position or attitude of the generator 10 or any part thereof in the attached drawings. The actual position of the generator 10 in use may be selected freely.

The generator 10 has an axial direction X and in the axial direction X a first end 10a and a second end 10b. The axial direction X denotes also a centre axis of the generator 10. A radial direction R of the generator 10 is a direction substantially transverse to the axial direction X. The generator 10 comprises a frame 20 and a power generating unit 30 supported to the frame 20. The power generating unit 30 is intended to convert a kinetic energy of at least one fluid flow supplied into the generator 10 to the electric energy.

The frame 20 has an axial direction that substantially coincides with the axial direction X of the generator 10. Therefore, the axial direction of the frame 20 and a centre axis of the frame 20 may also be denoted with the reference sign X. The frame 20 comprises a first end plate 21 at the first end 10a of the generator 10 and a second end plate 22 at the second end 10b of the generator 10, the second end plate 22 thus being at a distance from the first end plate 21 in the axial direction X of generator 10. The first end plate 21 provides a first end 20a of the frame 20 that in the embodiment of the generator 10 in the Figures provides the first end 10a of the generator 10, and the second end plate 22 provides a second end 20b of the frame 20 that in the embodiment of the generator 10 in the Figures provides the second end 10b of the generator 10.

The frame 20 further may comprise a number of support rods 23, in the embodiment of the Figures altogether four support rods 23, running substantially parallel to the axial direction X between the first end plate 21 and the second end plate 22. The support rods 23 fastens the first end plate 21 and the second end plate 22 to each other such that a space 24 for accommodating the power generating unit 30 is provided by the first end plate 21, the second end plate 22 and the support rods 23.

The power generating unit 30 has an axial direction that substantially coincides with the axial direction X of the generator 10. Therefore, the axial direction of the power generating unit 30 and a centre axis of the power generating unit 30 may also be denoted with the reference sign X. The power generating unit 30 has, in the axial direction X thereof, a first end 30a facing towards the first end 10a of the generator 10 and a second end 30b facing towards the second end 10b of the generator 10. A radial direction R of the power generating unit 30 is a direction substantially transverse to the axial direction X.

The power generating unit 30 has a stationary flow channel unit 40, a rotatable rotor 50 provided with a number of magnetic bridging element(s) 51 and at least one, i.e., one or more stationary inductance units 61, wherein the flow channel unit 40 and the rotor 50 are arranged substantially consecutively to each other in the axial direction X of the power generating unit 30, and wherein the rotor 50 is, in the embodiment of the Figures, arranged at least partly around the flow channel unit 40. Other embodiments, wherein the rotor 50 is not at least partly arranged around the flow channel unit 40 are, however, possible. The flow channel unit 40 is arranged to convey at least one fluid flow to the rotor 50 for causing the rotor 50 to operate, i.e., to rotate. In response to a rotation of the rotor 50, the at least one magnetic bridging element 51 arranged to the rotor 50 also rotates along at least one respective circumferential path about the centre axis X of the power generating unit 30. The rotation of the at least one magnetic bridging element 51 along with the rotating rotor 50 is arranged to provide a magnetic field rotating in respect of the at least one stationary inductance unit 61, thus causing electromotive force, i.e., voltage, being induced in the inductance unit 61. The magnetic bridging element 51 is a magnetic element comprising or being composed of magnetic material, such as ferromagnetic material or any other material or composite having magnetic properties. Preferably the magnetic bridging element 51 is a piece of iron or a piece of other ferromagnetic material or composite comprising ferromagnetic material.

Figure 2A:
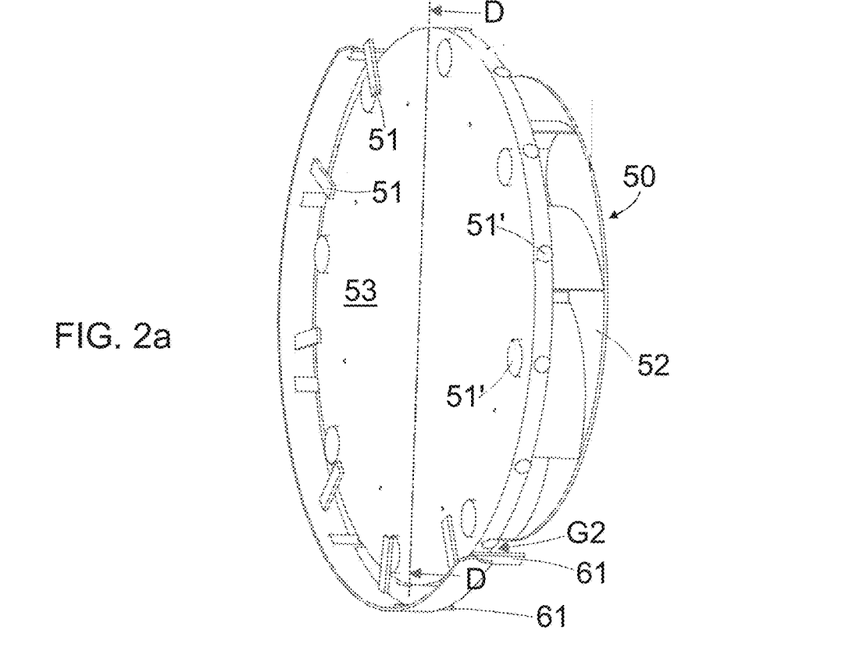
FIG. 2a shows schematically a perspective view of a rotor and an induction unit.
Figure 2B:
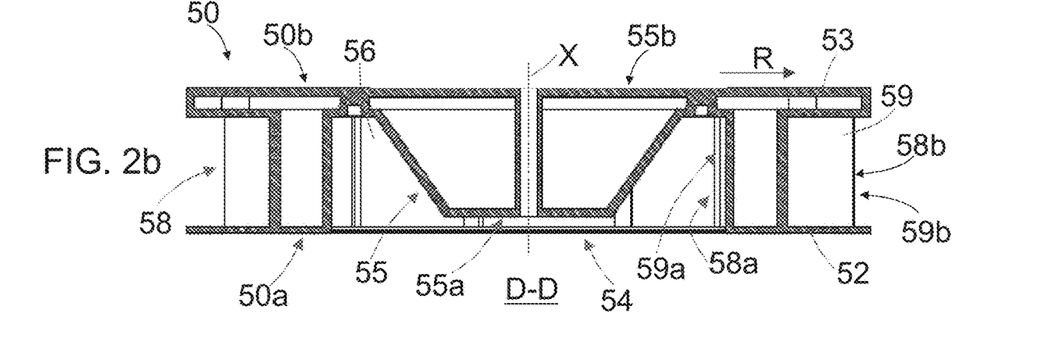
Figure 2C:
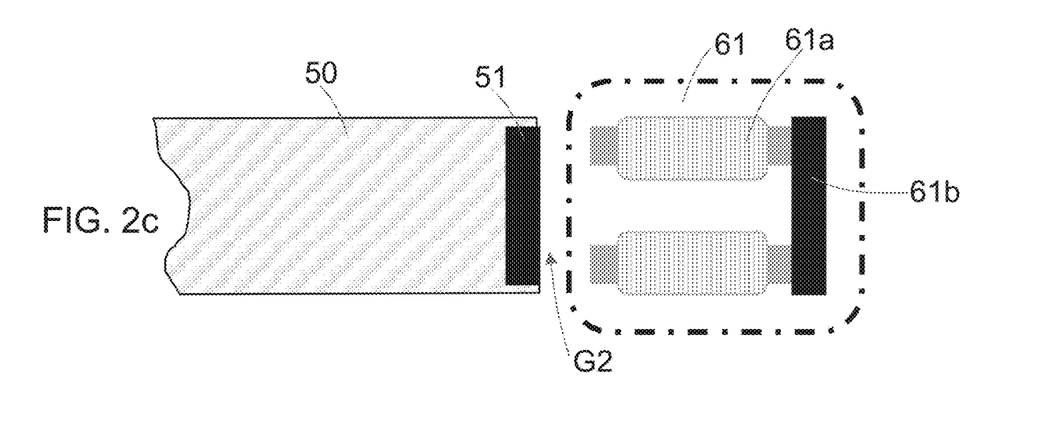
FIG. 2c shows schematically a side view of an example of combination of a magnetic bridging element and inductance unit with induction coils and a magnetic element.

An example of the inductance unit 61 is depicted in FIG. 2c, wherein two inductance coils 61a are connected to each other with a magnetic element 61b and placed within at an area of an influence G2 of the magnetic bridging element 51. The magnetic element 61b is a magnetic element comprising or being composed of magnetic material, such as ferromagnetic material or any other material or composite having magnetic properties. Preferably the magnetic element 61b is a piece of iron or a piece of other ferromagnetic material or composite comprising ferromagnetic material. The magnetic bridging element 51 is thus mounted on the rotating (moving) structure of the power generating unit 30, and the inductance unit 61 is mounted in the stationary part of the power generating unit 30. The magnetic bridging element 51 and the inductance unit 61 need to be placed within an area of influence G2 from each other so that the magnetic bridging element 51 rotating with the rotating structure, i.e., with the rotor 50, can induce the electromotive force in the induction unit 61 in response to the movement of the magnetic bridging element 51 relative to the induction unit 61. Some alternative examples of placement of magnetic bridging elements are shown with reference signs 51' in FIG. 2a. Key feature herein is that these magnetic bridging elements 51 are in the rotating part of the generator, within close proximity G2 of the inductance unit 61.

It is notified herein that in the embodiment of FIGS. 2a and 2c the inductance unit 61 is substantially next to the rotor 50, at a distance from the rotor 50, but in the embodiment of FIGS. 1a to 1d, the inductance unit 61 is in the axial direction of the generator 10 at a distance from a second end 50b of the rotor 50.

Figure 3A:
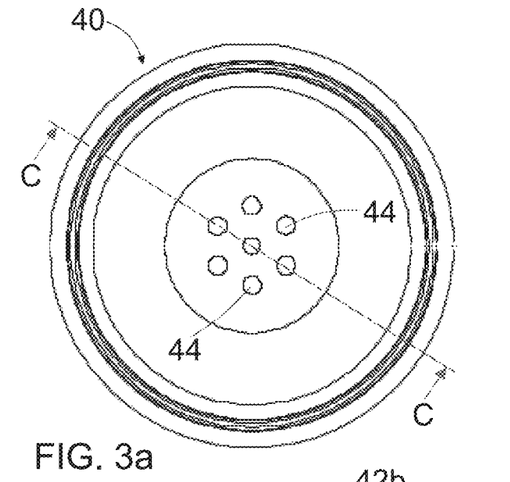
FIG. 3a shows schematically a bottom view of a flow channel unit of a power generating unit.
Figure 3B:
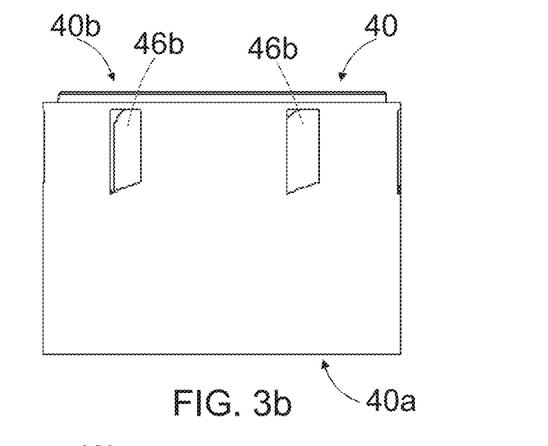
Figure 3C:
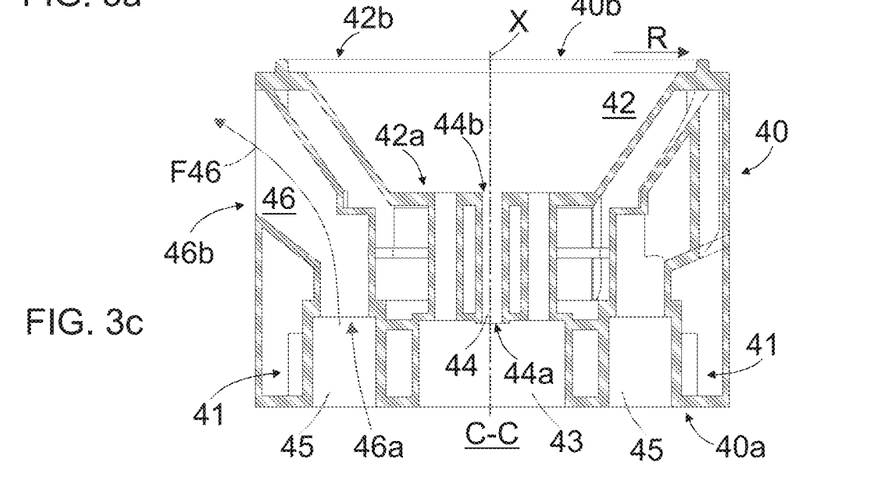

The power generating unit 30 is fastened to the first end plate 21 of the frame 20 of the generator 10 by fastening bolts 25 (e.g., FIG. 1c) inserted into respective fastening openings 41 in the flow channel unit 40 (e.g., FIGS. 1c and 3c). Other fastening means may also be provided. The flow channel unit 40 is thus fixed to the frame 20 of the generator 10 such that the flow channel unit 40 is stationary. The inductance unit 61 is mounted to the frame 20 in such a way that the inductance unit 61 is stationary. The rotor 50, that is arranged to be operated in response to fluid flow flowing to the rotor 50, is thus the only rotating part in the power generating unit 30. The power generating unit 30 thus consists of three main parts, i.e., the flow channel unit 40, the rotor 50, wherein the at least one magnetic bridging element 51 is arranged to, and the stationary frame 20 with inductance unit 61 fixed thereto. Of these parts two parts, i.e., the flow channel unit 40 and the frame 20, with the inductance unit 61, are stationary and only one part, i.e., the rotor 50, is a rotating part. The construction of the flow channel unit 40, the rotor 50 and frame 20 with the fixed inductance unit 61 and the operation of the power generating unit 30 are disclosed in more detail next.

Figure 3D:
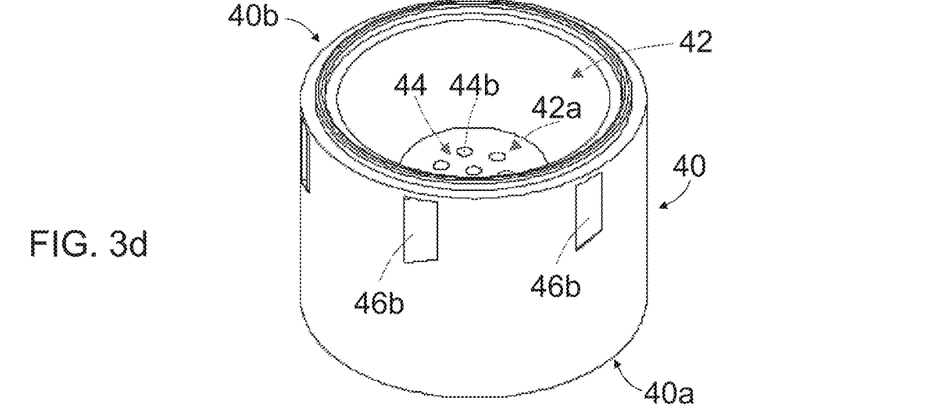
FIG. 3d shows schematically the flow channel unit of FIGS. 3a to 3c as seen obliquely from above.

FIG. 3a is a schematic bottom view of the flow channel unit 40 of the power generating unit 30 of FIGS. 1a to 1d, FIG. 3b is a schematic side view of the flow channel unit 40 of FIG. 3a, FIG. 3c is a schematic cross-sectional side view of the flow channel unit 40 of FIGS. 3a and 3b along the line C-C in FIG. 3a and FIG. 3d shows schematically the flow channel unit 40 of FIGS. 3a to 3c as seen obliquely from above. The flow channel unit 40 has an axial direction that substantially coincides with the axial direction X of the generator 10 and of the power generating unit 30. Therefore, the axial direction of the flow channel unit 40 and a centre axis of the flow channel unit 40 may also be denoted with the reference sign X. A radial direction R of the flow channel unit 40 is a direction substantially transverse to the axial direction X.

The flow channel unit 40 has, in the axial direction X thereof, a first end 40a intended to face towards the first end 10a of the generator 10 or the first end plate 21 of the frame 20 of the generator 10, the first end 40a of the flow channel unit 40 providing the first end 30a of the power generating unit 30. Furthermore, the flow channel unit 40 has, in the axial direction X thereof, a second end 40b intended to face towards the second end 30a of the power generating unit 30 or towards the rotor 50.

At the second end 40b of the flow channel unit 40 there is a chamber 42 having a shape of a truncated cone extending towards the first end 40a of the flow channel unit 40, a first end 42a of the chamber 42 having a smaller diameter and being directed towards the first end 40a of the flow channel unit 40 and a second end 42b of the chamber 42 having a larger diameter and being directed towards the second end 40b of the flow channel unit 40 or towards the rotor 50. The first end 42a of the chamber 42 is a substantially planar circular plate the centre of which substantially coincides with the centre axis X of the flow channel unit 40. The second end 42b of the chamber 42 is substantially open circle facing towards the second end 40b of the flow channel unit 40, i.e., towards the rotor 50, a centre of the second end 42b of the chamber 42 substantially coinciding with the centre axis X of the flow channel unit 40.

The flow channel unit 40 comprises a channel system intended to direct at least one fluid flow received by the flow channel unit 40 towards the rotor 50 to operate the rotor 50. The channel system of the flow channel unit 40 of FIGS. 3a to 3d comprises substantially at the first end 40a of the flow channel unit 40 at least one first inlet flow channel 43 and at least one second inlet flow channel 45 that is, in the radial direction R of the flow channel unit 40, farther away from a centre of the flow channel unit 40 than the at least one first inlet flow channel 43. The at least one first inlet flow channel 43 and the at least one second inlet flow channel 45 are intended to receive into the flow channel unit 40 at least one fluid flow for operating the rotor 50. In the embodiment of the Figures there is one first inlet flow channel 43 and six pieces of second inlet channels 45 arranged to surround the first inlet flow channel 43.

The channel system of the flow channel unit 40 comprises a set of first sub-channels 44 (e.g., FIGS. 3a, 3c, 3d) extending from the first inlet flow channel 43 up to the chamber 42, each first sub-channel 44 having an inlet opening 44a at the first inlet flow channel 43 and an outlet opening 44b at the first end 42a of the chamber 42, the outlet opening 44b extending through the plate providing the first end 42a of the chamber 42. The number of the first sub-channels 44 in the embodiment of the Figures is seven but this number may vary from one to more depending on for example the size or nominal power of the power generating unit 30. The fluid flow provided through the first sub-channels 44 is intended to provide a small gap G1 or clearance (FIG. 1c) between the flow channel unit 40 and the rotor 50 to allow the rotor 50 to float in the fluid flow and to rotate substantially freely, i.e., almost friction-free or at very low total efficient of the friction, relative to the flow channel unit 40 as explained in more detail later.

The channel system of the flow channel unit 40 further comprises a set of second sub-channels 46 (e.g. FIGS. 1d, 3b, 3c, 3d) extending from the second inlet flow channels 45 up to the outer circumference of the flow channel unit 40 substantially at the second end 40b of the flow channel unit 40, each second sub-channel 46 having an inlet opening 46a at the second inlet flow channel 45 and an outlet opening 46b at the outer circumference of the flow channel unit 40 substantially at the second end 40b of the flow channel unit 40, in the axial direction X of the flow channel unit 40, at a position of the flow channel unit 40 to be surrounded by the rotor 50. In the embodiment of the Figures the second sub-channels 46 are thus arranged to extend in at least partly radial direction R such that the outlet openings 46b of the second sub-channels 46 are arranged at an outer periphery of the flow channel unit 40, substantially at the position of the rotor 50, in the axial direction X of the flow channel unit 40.

The number of the second sub-channels 46 in the embodiment of the Figures is six, corresponding to the number of the second inlet flow channels 45, but this number may vary from one to more depending on for example the size or nominal power of the power generating unit 30. The fluid flow provided through the second sub-channels 46 is intended to cause the rotor 50 to rotate around its rotation axis, i.e., around the centre axis X of the rotor 50.

FIGS. 3a to 3d and the description above disclose only one possible embodiment of the flow channel unit 40, other embodiments of the flow channel unit 40, however, being possible.

FIG. 2a shows schematically a side view of the rotor 50. FIG. 2b shows schematically a cross-sectional side view of the rotor of FIG. 2a along the line D-D in FIG. 2a. The magnetic bridging element 51 shown in FIG. 2a are omitted in FIG. 2b. The rotor 50 has an axial direction that substantially coincides with the axial direction X of the generator 10 and of the power generating unit 30. Therefore, the axial direction of the rotor 50 and a centre axis of the rotor 50, providing a fictitious rotating axis of the rotor 50, may also be denoted with the reference sign X. A radial direction R of the rotor 50 is a direction substantially transverse to the axial direction X.

The rotor 50 has, in the axial direction X thereof, a first end plate 52 forming a first end 50a of the rotor 50, the first end 50a of the rotor 50 facing towards the first end 30a of the power generating unit 30 and the first end 40a of the flow channel unit 40. Furthermore, the rotor 50 has, in the axial direction X thereof, a second end plate 53 forming a second end 50b of the rotor 50 facing towards the second end 30b of the power generating unit 30.

The first end plate 52 of the rotor 50 comprises an opening 54 at a centre area of the first end plate 52. The second end plate 53 of the rotor 50 comprises, at a centre area of the second end plate 53, an extension 55 internal in the rotor 50 and having a shape of a truncated cone extending from the second end plate 53, i.e., from the second end 50b of the rotor 50, towards the opening 54 in the first end plate 52, i.e., towards the first end 50a of the rotor 50. The extension 55 has a first end 55a with a smaller diameter and being directed towards the flow channel unit 40 and a second end 55b with larger diameter and being directed away from the flow channel unit 40, i.e., towards the second end of the rotor 50 or the inductance unit 61.

The first end 55a of the extension 55 is a substantially planar, circular, solid plate the centre of which substantially coincides with the centre axis X of the rotor 50. The second end 55b of the extension 55 is substantially closed part of the second end plate 53 of the rotor 50, a centre of the second end 55b of the extension 55 substantially coinciding with the centre axis X of the rotor 50.

The shape and dimensions of the extension 55 in the rotor 50 is arranged such that it provides a counterpart with the chamber 42 in the flow channel unit 40, whereby the chamber 42 in the flow channel unit 40 can at least partly receive or accommodate the extension 55 in the rotor 50. The first end 55a of the extension 55 in the rotor 50 provides a counterpart surface for the first end 42a of the chamber 42 in the flow channel unit 40. Around the extension 55 in the rotor 50 there is an open space 56 which is intended to receive or accommodate the upper part of the outer circumference of the flow channel unit 40 when the power generating unit 30 is assembled.

The rotor 50 further comprises a number of wings 57 (e.g., FIG. 1d) providing a wing ring 58, the wing ring 58 thus being provided by a number of wings 57 following to each other at a distance from each other in the circumferential direction of the rotor 50. The wing ring 58 has an inner circumference 58a being substantially defined by an outer circumference of the open space 56 surrounding the extension SS, and an outer circumference 58b being substantially defined by an outer circumference of the rotor 50. The wings 57 are arranged to extend in a radial direction of the rotor 50, i.e., in the direction that is substantially transverse to the axial direction X of the rotor 50, in a curved manner from the inner circumference 58a of the wing ring 58 towards the outer circumference 58b of the wing ring 58.

The neighbouring wings 57 in the circumferential direction of the wing ring 58 define therebetween a number of rotor flow channels 59 extending from the direction of the inner circumference 58a of the wing ring 58 towards the outer circumference 58b of the wing ring 58 in a curved manner. Each flow channel 59 has an inlet opening 59a substantially at the inner circumference 58a of the wing ring 58 and an outlet opening 59b substantially at the outer circumference 58b of the wing ring 58. The number of the rotor flow channels 59 in the embodiment of the Figure is eight but may vary depending on for example the size or nominal power of the power generating unit 30 or on the type and viscosity of the fluid.

The inductance unit 61 is arranged and fixed in the power generating unit 30 in such a way that the inductance unit 61 is at an area of an influence of the magnetic bridging element 51 rotating with the rotor 50 but at a small distance apart from the magnetic bridging element 51 in the rotor 50 such that the magnetic bridging element 51 can freely rotate relative to the stationary inductance unit 61. In other words, there is a small gap G2 or clearance between the inductance unit 61 and the magnetic bridging element 51. In response to the magnetic bridging element 51 rotating relative to the inductance unit 61 electromotive force, i.e., voltage, is induced in the inductance unit 61.

When the electrical power outputs are connected to provide closed electric circuit (not shown for the sake of clarity), the voltage induced in the inductance unit 61 provides the electric current output from the generator 10. The number of the inductance units 61 in the embodiment may vary from one to more depending on for example the size or nominal power of the power generating unit 30.

Figures and the description above disclose only two possible embodiments of creating and mounting the inductance unit 61, other embodiments, however, being possible.

The generator 10 and the power generating unit 30 of the Figures may be assembled, in the position shown in the Figures, as follows. The rotor 50 is set on top of the flow channel unit 40 such that the chamber 42 in the flow channel unit 40 receives the extension 55 in the rotor 50, and the first end 42a of the chamber 42 in the flow channel unit 40 and the first end 55a of the extension 55 in the rotor 50 set substantially opposite to each other. The rotor 50 is therefore arranged at least partly around the second end 40a of the flow channel unit 40 such that the inlet openings 59a of the rotor flow channels 59 coincide in the axial direction X of the power generating unit 30 with the outlet openings 46b of the second sub-channels 46 in the flow channel unit 40. Thereafter the flow channel unit 40 together with the rotor 50 is fastened to the first end plate 21 of the frame 20 of the generator 10 for example by fastening bolts 25, and the support rods 23 are also fastened to the first end plate 21 of the frame 20. The assembly may be continued by fastening the inductance unit 61 to the second end plate 22 of the frame 20 of the generator 10 and thereafter by fastening the inductance unit 61 with the second end plate 22 of the frame 20 to the support rods 23 such that a small gap G2 (FIG. 1c) is left in the axial direction X of the power generating unit 30 between the magnetic bridging element 51 in the rotor 50 and the inductance unit 61. Other assembling orders are, however, possible.

The operation of the generator 10 of the Figures is as follows.

The fluid flow, shown schematically in FIG. 1c with arrows denoted with reference sign F, is conveyed into the flow channel unit 40 at the first end 40a of the flow channel unit 40 through an opening 28 in the first end plate 21 of the frame 20 indicated schematically with broken lines. In the flow channel unit 40 a portion of the fluid flow F will flow into the first sub-channels 44 through the inlet openings 44a of the first sub-channels 44 and further through the first sub-channels 44 into the chamber 42 through the outlet openings 44b of the first sub-channels 44. The portion of the fluid flow flowing through the first sub-channels 44 into the chamber 42, as shown schematically in FIG. 1c with an arrow denoted with the reference sign F44, is arranged to provide in the chamber 42 a pressure effect between the first end 42a of the chamber 42 in the flow channel unit 40 and the first end 55a of the extension 55 in the rotor 50. This pressure effect causes the rotor 50 in the axial direction X to move a little bit or a small distance away from the flow channel unit 40 such that a small gap G1, the position of which is denoted schematically in FIG. 1c with an arrow G1, will appear between the flow channel unit 40 and the rotor 50. This pressure effect thus causes the rotor 50 to remain, i.e., to float, at a small distance from the flow channel unit 40 in the axial direction X of the power generating unit 30.

In the flow channel unit 40 a portion of the fluid flow F will flow into the second sub-channels 46 through the inlet openings 46a, and through the second sub-channels 46 and the outlet openings 46b thereof tangentially further into the rotor flow channels 59 in the rotor 50 through the inlet openings 59a of the rotor flow channels 59, as shown schematically in FIG. 1c with an arrow denoted with the reference sign F46. Furthermore, the fluid flow F46 flows through the rotor flow channels 59 and the outlet openings 59b of the rotor flow channels 59 out of the rotor 50, in a substantially radial direction R of the rotor, causing the rotor 50 to rotate due to the interaction between the pressure of the fluid flow F46 and the wings 57 in the rotor 50. The positioning of the outlet openings 46b of the second sub-channels 46 on the outer circumference of the flow channel unit 40 and the number of the second sub-channels 46 in the flow channel unit 40 and the number of the rotor flow channels 59 is selected such that even if in the power generating unit 30 the number of the second sub-channels 46 in the flow channel unit 40 and the number of the rotor flow channels 59 may deviate from each other, there is always, during the operation of the power generating unit 30, at least some second sub-channels 46 in the flow channel unit 40 that are in flow contact with at least some rotor flow channels 59 in the rotor 50, thus providing a constant rotation of the rotor 50.

In the power generating unit 30 disclosed above the same fluid flow is utilized both to provide the pressure effect between the flow channel unit 40 and rotor 50 causing the rotor 50 to remain, i.e., to float, at a small distance from the flow channel unit 40 in the axial direction X of the power generating unit 30, as well as to rotate the rotor 50. The pressure effect between the flow channel unit 40 and rotor 50 causing the rotor 50 to remain, i.e., to float, at a small distance from the flow channel unit 40 in the axial direction X of the power generating unit 30 decreases friction between the flow channel unit 40 and the rotor 50, allowing the rotor 40 to rotate substantially or almost friction-free, i.e., at very low total coefficient of friction, about the flow channel unit 40. This solution thus provides a so-called floating bearing solution in the generator 10. This increases the coefficient of the efficiency in respect of traditional bearing solutions utilized in prior art generators, the operation and construction being, however, simple.

When the rotor 50 rotates, the magnetic bridging element 51 rotates in response to the rotation of the rotor 50, the magnetic bridging element 51 thereby rotating relative to the inductance unit 61 and causing electromotive force, i.e. voltage, being induced in the inductance unit 61. When the electrical power outputs for the inductance unit 61 are connected to provide closed electric circuit (not shown for the sake of clarity), the voltage, induced in the inductance unit 61 provides the electric current output from the generator 10.

According to an embodiment the inductance unit 61 may be equipped with a servo motor arrangement comprising at least one servomotor so as to control the size of the gap G2 between the magnetic bridging element 51 and the inductance unit 61, and thereby indirectly also to control the size of the gap G1 between the flow control unit 40 and the rotor 50, based on the electromagnetic forces affecting between the magnetic bridging element 51 and the inductance unit 61 when the power generating unit 30 is operating. Additionally, or alternatively, the size of the gap G1 between the flow control unit 40 and the rotor 50 may take place by controlling the fluid rate and/or pressure intended to cause the rotor 50 to float. FIG. 1*a*, for example, discloses schematically control means 26, 27 intended to control the fluid rates and/or pressures of the fluid flows causing the rotor to float and rotate. The control of the size of the gap G2 between the magnetic bridging element 51 and the inductance unit 61, and thereby indirectly also the control of the size of the gap G1 between the flow control unit 40 and the rotor 50, or vice versa, and other possible controls applied in the generator, may take place by computer-aided means.

The fluid flow F may for example be, but not limited to, an air flow, a steam flow, an exhaust gas flow or liquid flow with a sufficient pressure, or a pressurized flow of at least one of the air flow, the steam flow, the exhaust gas flow and the liquid flow. The fluid flow F may thus also be a mixture of at least one of the air flow, the steam flow, the exhaust gas flow and the liquid flow. The fluid flow F may take place gaseous, supercritical or heterogeneous fluid phase. In the case of the fluid flow F being the air flow, the air flow may be an air flow due to a wind, whereby the generator 10 may be utilized in the wind turbines, for example. The air flow may also be a pressurized air flow in an industrial pressurized air system, for example. In the case of the fluid flow F being the steam flow, the steam flow may originate from an engine or a system generating the steam flow. In the case of the fluid flow F being the exhaust gas flow, the exhaust gas flow may originate from an engine or a system generating the exhaust gas. In the case of the fluid flow F not having a pressure high enough for properly operating the power generating unit 30, a pressure increasing arrangement, comprising for example a number of adjustable jet nozzles, for increasing the pressure of the fluid flow F may be arranged at the inlet of the flow channel unit 40. A typical pressure of the fluid flow F to be supplied into the generator 10 may for example be, but not limited to, 8 to 15 bars.

A nominal power of the generator 10 disclosed may vary for example, but not limited to, between 1 kW and 1 MW. A typical rotation speed of the rotor 50 may for example be, but not limited to, 3000-50000 rpm.

In the embodiment disclosed above, the same fluid flow in same fluid phase is used both to cause the rotor to float as well as to rotate the rotor. However, the fluid flows causing the rotor to float and to rotate may be different fluid flows in same fluid phase or in different fluid phases or same fluid flow in different fluid phases. Furthermore, in the embodiment disclosed above, the supply directions of the fluid flows causing the rotor to float and to rotate the rotor are same but the supply directions of the fluid flows causing the rotor to float and to rotate the rotor may also be different.

Furthermore, in the embodiment disclosed above, the rotor does not comprise any specific rotor shaft, but the rotor could also comprise a shaft, which may also be hollow in order to provide at least one flow channel and/or which may take part in centralization of the rotor in the power generating unit.

Furthermore, in the embodiment disclosed above, the generator comprises only one rotor and one flow channel unit. However, the number of rotors and flow channel units in the generator may vary. Additionally, for example, the size of the rotors in a generator comprising at least two rotors may vary for example to provide an optimized size in view of the nominal power of the generator. The generator may thus comprise a rotor system comprising at least two rotors.

It will be obvious to a person skilled in the art that this novel solution may also be used in reverse mode, meaning that the almost friction free structure disclosed may be used to generate flow of fluids when electrical power is applied to the inductance units. The benefits or intended end uses of operation in reverse mode are numerous, ranging from clean air transfer to fluid transportation, especially in tasks where presence of shaft lubrication, bearings or other potential sources of impurities are present.

It will be obvious to a person skilled in the art that, as the technology advances, the inventive concept can be implemented in various ways. The invention and its embodiments are not limited to the examples described above but may vary within the scope of the claims.

The invention claimed is:
1. A generator comprising
   at least one rotor,
   at least one magnetic bridging element arranged to rotate about a rotation axis of the rotor in response to the rotation of the rotor,
   at least one inductance unit comprising an inductance coil and a magnetic element at an area of an influence of the moving magnetic bridging element for inducing electromotive force in response to the movement of the magnetic bridging element relative to the inductance unit, and
   at least one flow channel unit for conveying a fluid flow to the rotor for operating the rotor,
   wherein the rotor is arranged to rotate relative to the flow channel unit,
   wherein the flow channel unit comprises at least one channel for conveying at least one fluid flow between the flow channel unit and the rotor to create a pressure effect between the flow channel unit and the rotor to push, in the axial direction of the flow channel unit and the rotor, the rotor away from the flow channel unit such that a gap is arranged between the flow channel unit and the rotor for allowing the rotor to rotate relative to the flow channel unit substantially friction-free, and
   wherein the flow channel unit comprises at least one channel for conveying at least one fluid flow to the rotor for rotating the rotor.

2. The generator as claimed in claim 1, wherein the at least one magnetic bridging element is arranged at the rotor.

3. The generator as claimed in claim 1, wherein the flow channel unit and the rotor have a common axial direction and the flow channel unit and the rotor are arranged in the axial direction substantially successively to each other.

4. The generator as claimed in claim 3, wherein the inductance unit is stationary in the generator.

5. The generator as claimed in claim 1, wherein the rotor is arranged to rest on the flow channel unit when the generator is not in use, and to float relative to the flow channel unit when the generator is in operation.

6. The generator as claimed in claim 1 wherein the flow channel unit comprises at least one first inlet flow channel and at least one second inlet flow channel, the at least one first inlet flow channel being arranged to convey a fluid flow to the at least one channel conveying at least one fluid flow to create the pressure effect between the flow channel unit and the rotor and the at least one second inlet flow channel being arranged to convey a fluid flow to the at least one channel conveying at least one fluid flow to the rotor for rotating the rotor.

7. The generator as claimed in claim 1, wherein the rotor is arranged to at least partly surround the flow channel unit.

8. The generator as claimed in claim 7, wherein at least one channel conveying at least one fluid flow to the rotor for rotating the rotor is arranged to extend in the flow channel unit in at least partly radial direction such that an outlet opening of the channel is arranged at an outer periphery of the flow channel unit at the position of the rotor in an axial direction of the flow channel unit.

9. The generator as claimed in claim 7, wherein the at least one rotor comprises a number of rotor flow channels extending in at least partly radial direction of the rotor, the fluid flow flowing through the rotor flow channels rotating the rotor.

10. The generator as claimed in claim 1, wherein the fluid flow is a flow of at least one of air, steam, exhaust gas and liquid.

11. The generator as claimed in claim 1, wherein the fluid is in gaseous, supercritical, or heterogeneous fluid phase.

12. A generator comprising
at least one rotor,
at least one magnetic bridging element arranged to rotate about a rotation axis of the rotor in response to the rotation of the rotor,
at least one inductance unit comprising an inductance coil and a magnetic element at an area of an influence of the moving magnetic bridging element for inducing electromotive force in response to the movement of the magnetic bridging element relative to the inductance unit, and
at least one flow channel unit for conveying a fluid flow to the rotor for operating the rotor,
wherein the rotor is arranged to rotate relative to the flow channel unit,
wherein the rotor is arranged to at least partly surround the flow channel unit,
wherein the flow channel unit comprises, in the axial direction thereof, a first end and a second end and the rotor comprises, in the axial direction thereof, a first end facing towards the flow channel unit and a second end facing away from the flow channel unit, and
wherein at the first end of the rotor, an opening is arranged to receive the second end of the flow channel unit so as to arrange the rotor to partly surround the flow channel unit at the second end of the flow channel unit in the axial direction of the flow channel unit and the rotor.

13. The generator as claimed in claim 12, wherein the flow channel unit comprises a chamber being open towards the rotor and the rotor comprises at the opening an extension extending from the second end of the rotor towards the opening, the chamber in the flow channel unit being arranged to at least partly accommodate the extension in the rotor when the extension is inserted into the chamber.

14. The generator as claimed in claim 13, wherein the chamber in the flow channel unit comprises a first end and a second end and the extension in the rotor comprises a first end and a second end and wherein the first end of the chamber and the first end of the extension are arranged to face to each other when the extension is inserted into the chamber, and
wherein the at least one channel conveying at least one fluid flow to create the pressure effect between the flow channel unit and the rotor is arranged to convey the at least one fluid flow portion between the first end of the chamber and the first end of the extension through at least one outlet opening of the at least one channel arranged at the first end of the chamber.

15. An apparatus comprising a generator configured to generate flow of fluid, the generator comprising:
at least one rotor,
at least one magnetic bridging element arranged to rotate about a rotation axis of the rotor in response to the rotation of the rotor,
at least one inductance unit comprising an inductance coil and a magnetic element at an area of an influence of the moving magnetic bridging element for inducing electromotive force in response to the movement of the magnetic bridging element relative to the inductance unit, and
at least one flow channel unit for conveying a fluid flow to the rotor for operating the rotor,
wherein the rotor is arranged to rotate relative to the flow channel unit,
wherein the flow channel unit comprises at least one channel for conveying at least one fluid flow between the flow channel unit and the rotor to create a pressure effect between the flow channel unit and the rotor to push, in the axial direction of the flow channel unit and the rotor, the rotor away from the flow channel unit such that a gap is arranged between the flow channel unit and the rotor for allowing the rotor to rotate relative to the flow channel unit substantially friction-free, and
wherein the flow channel unit comprises at least one channel for conveying at least one fluid flow to the rotor for rotating the rotor, and
wherein the apparatus is a fan or ventilator.

16. The apparatus as claimed in claim 15, wherein the flow channel unit and the rotor have a common axial direction and the flow channel unit and the rotor are arranged in the axial direction substantially successively to each other.

17. The apparatus as claimed in claim 16, wherein the inductance unit is stationary in the generator.

18. The apparatus as claimed in claim 15, wherein the flow channel unit comprises at least one first inlet flow channel and at least one second inlet flow channel, the at least one first inlet flow channel being arranged to convey a fluid flow to the at least one channel conveying at least one fluid flow to create the pressure effect between the flow channel unit and the rotor and the at least one second inlet flow channel being arranged to convey a fluid flow to the at least one channel conveying at least one fluid flow to the rotor for rotating the rotor.

19. The apparatus as claimed in claim 15, wherein the rotor is arranged to at least partly surround the flow channel unit.

20. The apparatus as claimed in claim 19, wherein the flow channel unit comprises, in the axial direction thereof, a first end and a second end and the rotor comprises, in the axial direction thereof, a first end facing towards the flow channel unit and a second end facing away from the flow channel unit, and wherein at the first end of the rotor, an opening is arranged to receive the second end of the flow channel unit so as to arrange the rotor to partly surround the flow channel unit at the second end of the flow channel unit in the axial direction of the flow channel unit and the rotor.

* * * * *